US010974213B2

(12) United States Patent
Behringer et al.

(10) Patent No.: US 10,974,213 B2
(45) Date of Patent: Apr. 13, 2021

(54) ROTARY REAGENT TRAY ASSEMBLY AND METHOD OF MIXING SOLID-PHASE REAGENTS

(75) Inventors: Bruce Behringer, Park Ridge, NJ (US); Adrian Campbell, Stamford, CT (US); Nicolae Dumitrescu, Stamford, CT (US); Beri Cohen, Hartsdale, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 2919 days.

(21) Appl. No.: 13/505,469

(22) PCT Filed: Nov. 3, 2009

(86) PCT No.: PCT/US2009/063025
§ 371 (c)(1),
(2), (4) Date: Nov. 16, 2012

(87) PCT Pub. No.: WO2011/056165
PCT Pub. Date: May 12, 2011

(65) Prior Publication Data
US 2012/0218854 A1    Aug. 30, 2012

Related U.S. Application Data

(60) Provisional application No. 61/118,706, filed on Dec. 1, 2008.

(51) Int. Cl.
*B01F 9/00* (2006.01)
*B01F 11/00* (2006.01)
(Continued)

(52) U.S. Cl.
CPC ............ *B01F 9/002* (2013.01); *B01F 9/0005* (2013.01); *B01F 11/0002* (2013.01);
(Continued)

(58) Field of Classification Search
CPC ...... B01F 9/002; B01F 9/0005; B01F 9/0003; B01F 11/0002; B01F 11/0005;
(Continued)

(56) References Cited

U.S. PATENT DOCUMENTS 5,133,208 A * 7/1992 Ricci ..................... B04B 5/0414
494/10
5,320,808 A * 6/1994 Holen ..................... B01L 3/508
422/64
(Continued)

FOREIGN PATENT DOCUMENTS

CN          1648669 A     8/2005
CN       101071138 A    11/2007
(Continued)

OTHER PUBLICATIONS

English translation of Chinese Office Action of corresponding Chinese patent Application No. 200980133693.9, 23 Pages.

*Primary Examiner* — Marc C Howell

(57) ABSTRACT

An apparatus for and method of enabling enhanced, selective agitation of liquid containing a solid-phase reagent. The apparatus includes at least one liquid-bearing container, a circular tray, and a motor. The liquid-bearing container(s) includes at least one internal baffle that imparts turbulent agitation to the liquid when flowing from one end of the container to an opposite end. The circular tray is adapted for selective rotation about a vertical axis of rotation. The rotary circular tray assembly includes container-receiving stations that selectively retain a respective liquid-bearing container in an inclined or pitched orientation with respect to a horizontal plane. The motor creates centrifugal force, which causes liquid in the container(s) to travel from the first end of the container to the second end of the container via the internal baffle(s), agitating the liquid and the solid-phase portions of the reagent. When gravitational force exceeds the (Continued)

centrifugal force, liquid in the container(s) travels from the second end of the container to the first end of the container via the internal baffle(s), again agitating the liquid and the solid-phase portions of the reagent.

24 Claims, 6 Drawing Sheets

(51) Int. Cl.
*B01F 15/00* (2006.01)
*G01N 35/04* (2006.01)
*G01N 35/00* (2006.01)

(52) U.S. Cl.
CPC .... *B01F 11/0005* (2013.01); *B01F 15/00896* (2013.01); *B01F 2009/0089* (2013.01); *B01F 2009/0092* (2013.01); *G01N 2035/00445* (2013.01); *G01N 2035/00504* (2013.01); *G01N 2035/0449* (2013.01); *G01N 2035/0455* (2013.01)

(58) Field of Classification Search
CPC .......... B01F 15/00896; B01F 15/00889; B01F 2009/0092; G01N 2035/00445; G01N 2035/00504; G01N 2035/0449; G01N 2035/0455
USPC .......................................................... 366/140
See application file for complete search history.

(56) References Cited

U.S. PATENT DOCUMENTS

| | | | |
|---|---|---|---|
| 5,358,691 A | | 10/1994 | Clark et al. |
| 5,451,528 A | * | 9/1995 | Raymoure ................ B01L 3/08 |
| | | | 422/64 |
| 5,511,880 A | * | 4/1996 | Macemon ............... B01F 9/002 |
| | | | 366/213 |
| 5,788,928 A | * | 8/1998 | Carey ................ B01F 13/0016 |
| | | | 206/219 |
| 6,824,738 B1 | | 11/2004 | Neeper et al. |

FOREIGN PATENT DOCUMENTS

| | | |
|---|---|---|
| JP | H 01-150776 A | 6/1989 |
| JP | H 05-506512 A | 9/1993 |
| JP | H 07-505343 A | 6/1995 |
| JP | H 08-43400 A | 2/1996 |
| JP | H 09-033535 A | 2/1997 |
| JP | H 10-19901 A | 1/1998 |
| JP | H 11-502625 A | 3/1999 |
| JP | 2004-333219 A | 11/2004 |
| JP | 2007-132823 A | 5/2007 |
| WO | 2004045771 A1 | 6/2004 |

* cited by examiner

ROTARY REAGENT TRAY ASSEMBLY AND METHOD OF MIXING SOLID-PHASE REAGENTS

STATEMENT REGARDING FEDERALLY SPONSORED RESEARCH OR DEVELOPMENT

Not Applicable

BACKGROUND OF THE INVENTION

The present invention relates to reagent trays for automated immunoassay systems, and more particularly to rotary reagent tray assemblies that are structured and arranged to promote homogenous mixing of solid-phase reagents using rotary motion of the ring and centrifugal force.

Previous immunoassay systems have included linear reagent trays for holding reagent packs, such as ReadyPack reagent packs manufactured by Siemens Healthcare Diagnostics, Inc. of Tarrytown, N.Y. Typically, linear reagent trays are adapted to rock about a point of rotation so that the rocking, back-and-forth motion maintains most of the solid-phase portion of the reagent in suspension. However, even with automatic rocking motion, it is not always possible to suspend all solid-phase portions of the reagent adequately. As a result, some reagent packs must be manually mixed and agitated before being installed in the reagent tray. A further problem with applying a rocking motion is that the motion must be continuously applied to the reagent packs so that the solid-phase portion of the reagent does not settle out. This "24/7" approach produces more wear and tear on the system and also affects the on-board stability of the reagent.

U.S. Pat. No. 5,451,528 to Raymoure et al. (the "'528 Patent") purports to disclose methods of modifying a liquid assay reagent for prolonged longevity. The method includes adding an inert material to the liquid assay reagent. In addition, according to the '528 patent, the liquid assay reagent is automatically agitated by the back-and-forth motion of a reagent carousel onto which reagent packs containing the liquid assay reagent are loaded. The acceleration, velocity, distance moved, and pause-asymmetry can be changed to provide "rapid assay reagent resuspension without foaming or bubble formation." In short, the '528 patent relies on centripetal forces and the hurky-jerky movement of the carousel to "slosh" the liquid assay reagent sufficiently to maintain the solid-phase portions of the reagent in suspension.

However, "sloshing" due to hurky-jerky centripetal forces can result in solid-phase portions of the reagent adhering to the sides or walls and even to the lid of the liquid-carrying container. Such a result would reduce the percentage or concentration of the solid-phase portion in the reagent.

Accordingly, it would be desirable to provide a rotary reagent tray assembly that is adapted to use the movement and energy of the tray rotation and stopping to mix and agitate the solid-phase portion of a liquid assay reagent, and, thereby, to eliminate the need for manual mixing/agitation prior to installation of the reagent packs in the reagent tray. Moreover, it would be desirable to provide a rotary reagent tray that is adapted to use centrifugal forces resulting from the rotational movement of a rotary reagent tray to mix and agitate the solid-phase portion of a liquid assay reagent, and, thereby, eliminate the possibility of loss of some of the solid-phase portion through adherence to an inner surface of the reagent pack due to uncontrolled centripetal "sloshing".

In comparison with linear reagent trays that use a rocking, back-and-forth movement to suspend solid-phase portions, rotary reagent trays increase the capacity of the reagent tray while minimizing the footprint of the tray. Moreover, advantageously, lateral travel requirements of the aspirating reagent probe are reduced and can result in replacement of a three-axis of control probe with a simpler, two-axis probe mechanism.

SUMMARY OF TEE INVENTION

An apparatus for and method of enabling enhanced, selective agitation of liquid containing a solid-phase reagent are disclosed. The apparatus includes at least one liquid-bearing container, a circular tray, and a motor. The liquid-bearing container(s) has a first end and an opposite second end between which is disposed at least one internal baffle. The internal baffle imparts turbulent agitation to the liquid when flowing from one end of the container to an opposite end.

The circular tray is adapted for selective rotation about a vertical axis of rotation. The rotary circular tray has plural container-receiving stations arranged radially in a circle on the tray. Each station is further adapted to receive and to selectively retain a respective liquid-bearing container in an orientation whereby the container is inclined or pitched with respect to a horizontal plane. Moreover, the first end of the container, which is proximate the axis of rotation, is disposed lower than the second end of the container, which is distant from the axis of rotation.

The motor is in driving engagement with the tray and is, further, adapted for selectively rotating the tray.

In pertinent part, centrifugal force, which is associated with the rotation or rotational acceleration of the tray by the motor, causes liquid in the container(s) to travel from the first end of the container to the second end of the container via the internal baffle(s), causing the liquid and the solid-phase portions of the reagent therein to be agitated so as to promote continued suspension or resuspension of the solid-phase portions. When gravitational force, which is associated with the cessation of rotation or the rotational deceleration of the tray by the motor, exceeds the centrifugal force, liquid in the container(s) travels from the second end of the container to the first end of the container via the internal baffle(s), again causing the liquid and the solid-phase portions of the reagent therein to be agitated so as to promote continued suspension or resuspension of the solid-phase portions.

The method of selectively agitating liquid in a container includes providing the liquid-bearing container(s); providing the rotatable circular tray; disposing the container(s) on a respective container-receiving station associated with the tray; selectively rotating the tray so that centrifugal force generated causes liquid in the container(s) to travel from the first end of the container to the second end via the internal baffle(s), which causes the liquid and the solid-phase portions of the reagent therein to be agitated so as to promote continued suspension or resuspension of the solid-phase portions, and selectively decelerating or stopping the tray so that gravitational force exceeds the centrifugal force, causing liquid in the container(s) to travel from the second end of the container to the first end of the container via the internal baffle(s), again causing the liquid and the solid-phase portions of the reagent therein to be agitated so as to promote continued suspension or resuspension of the solid-phase portions.

DESCRIPTION OF THE DRAWINGS

The invention will be more fully understood by reference to the following Detailed Description of the invention in conjunction with the Drawings, of which.

DETAILED DESCRIPTION

Figure 1:
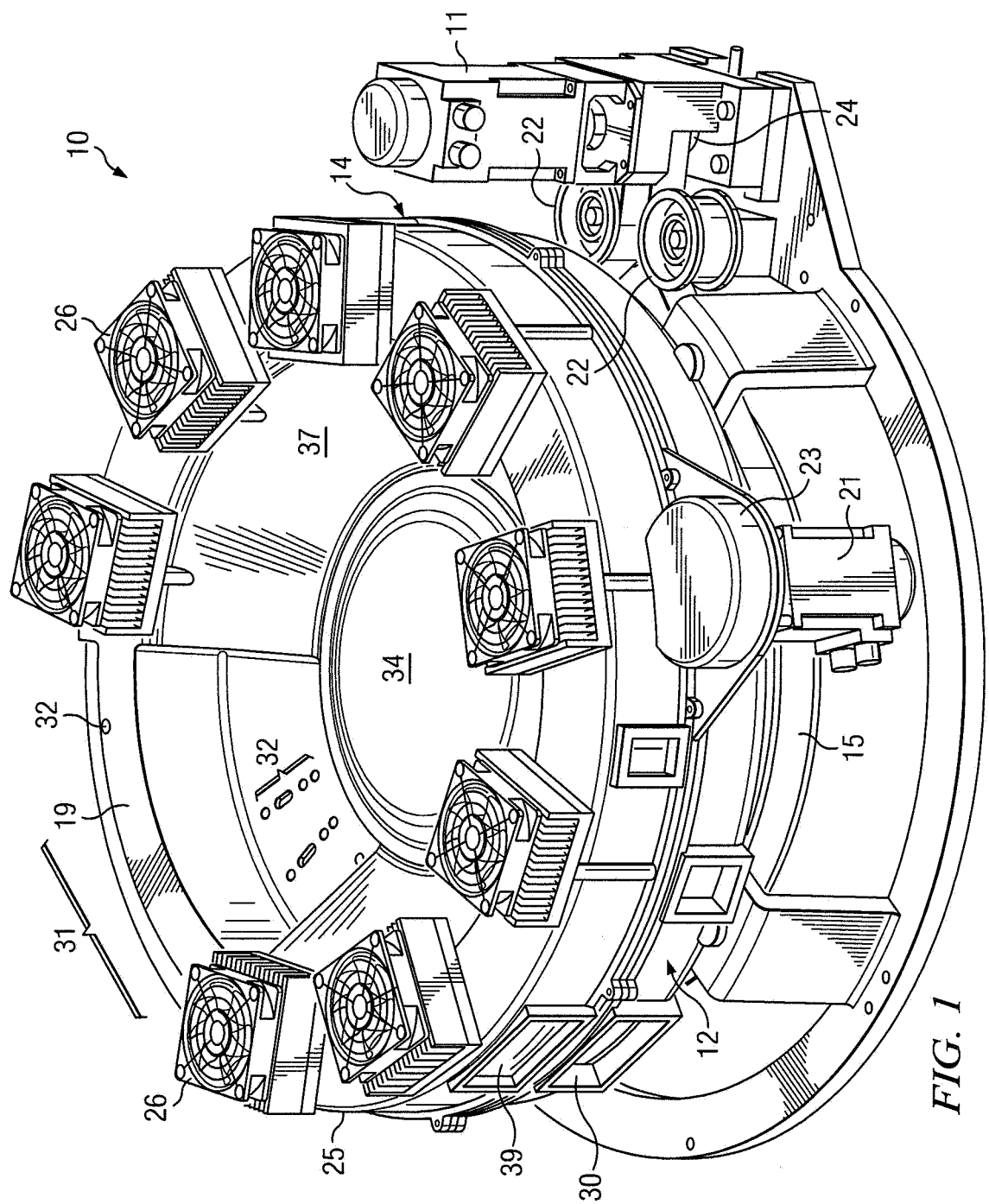
FIG. 1 shows an illustrative schematic of a rotary reagent tray assembly and reagent compartment for an assay testing system.
Figure 2:
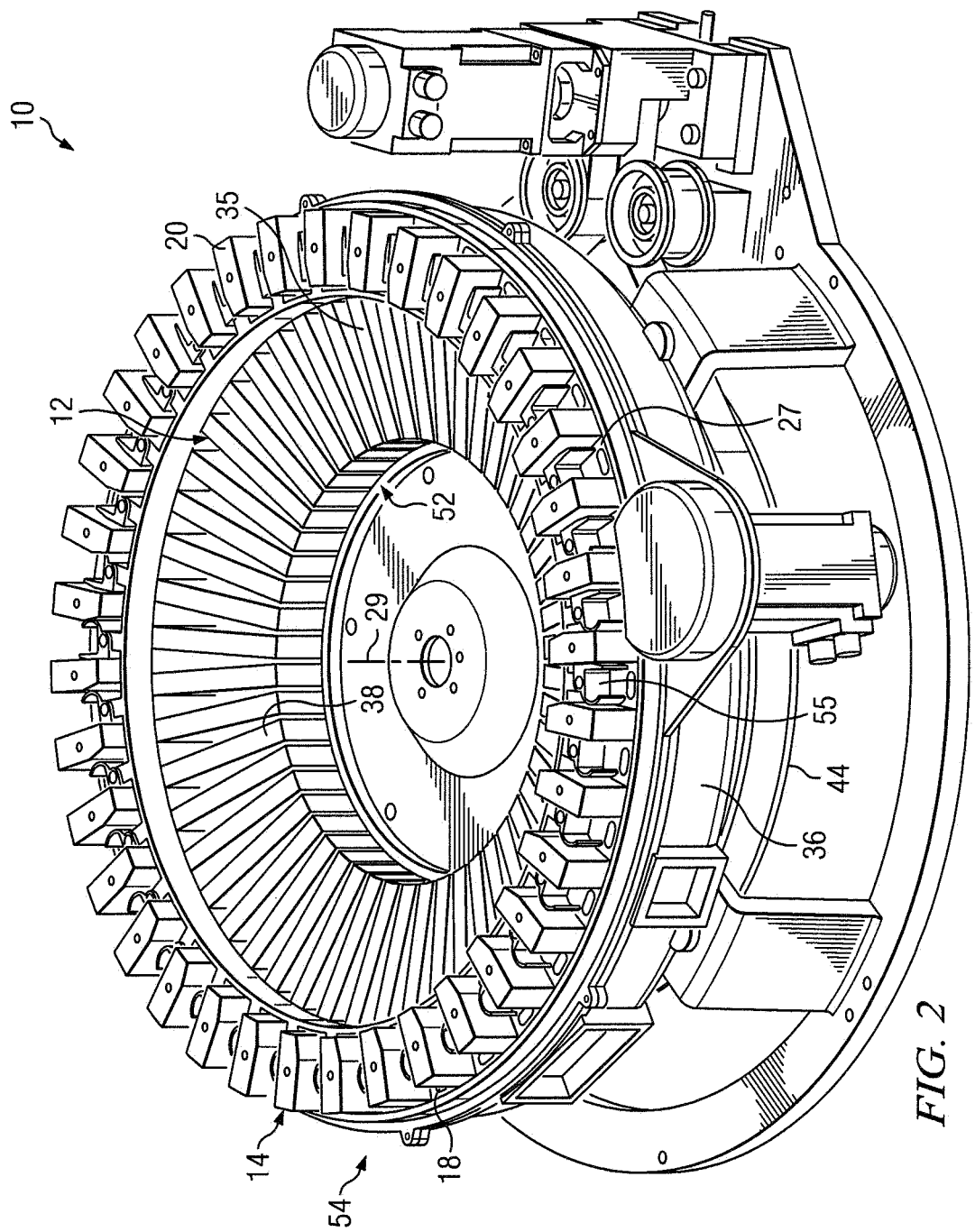
FIG. 2 shows an illustrative schematic of the rotary reagent tray assembly of FIG. 1 with the cover of the ancillary tray removed.
Figure 3:
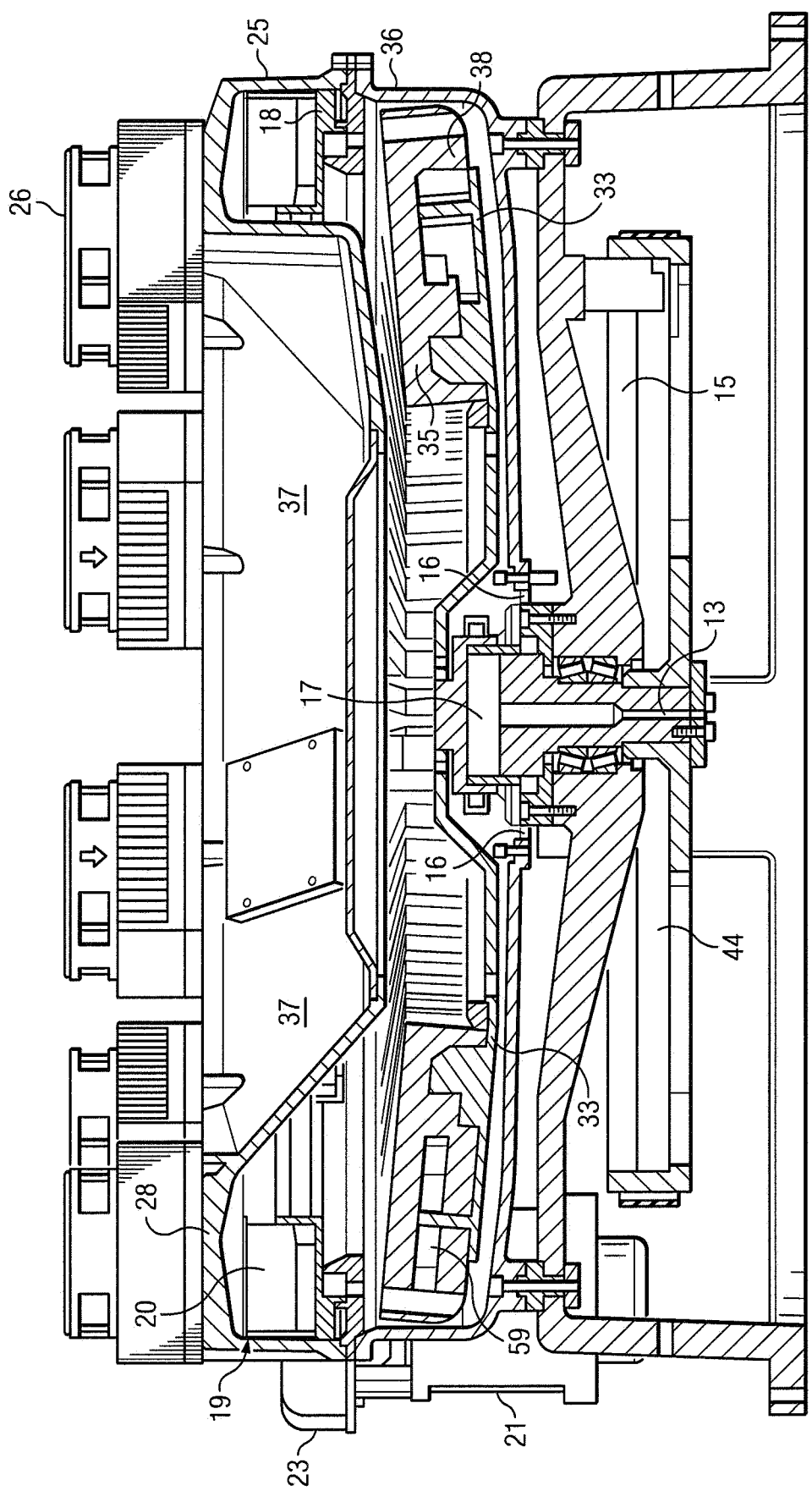
FIG. 3 shows a cross-section of the rotary reagent tray assembly of FIG. 1.

Referring to FIGS. 1-3, a rotary reagent tray or carousel assembly will be described. The rotary reagent tray assembly 10 is structured and arranged to hold a plurality of primary reagent packs 35 and/or ancillary reagent packs 20, respectively, in a primary tray 12 and an ancillary tray 14. The primary tray 12 and the ancillary tray 14 are arranged in the rotary reagent tray assembly 10 coaxially and concentric with one another about a vertical axis 29. Although the invention will be described in terms of having both a primary tray 12 and an ancillary tray 14, the invention could also be practiced using just a primary reagent tray.

The primary reagent tray 12 is shown mechanically coupled to a primary motor 11 via a drive shaft 13, a drive pulley 44, and a pulley belt 15. The primary motor 11, drive shaft 13, drive pulley 44, and pulley belt 15 are structured and arranged to provide independent, bi-directional movement to the primary reagent tray 12 by applying torque to the drive shaft 13.

Figure 7:
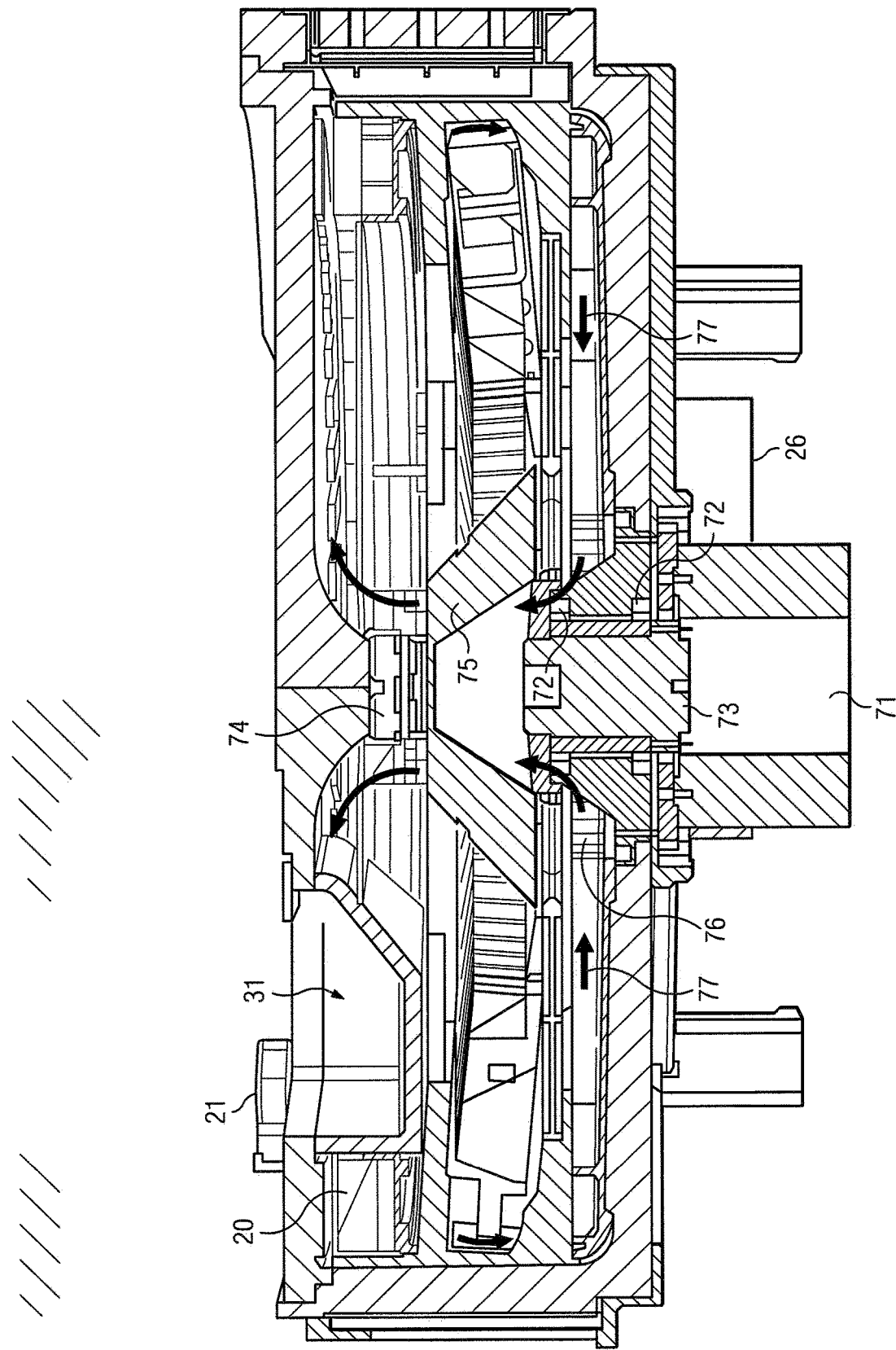
FIG. 7 shows a cross-section of an alternative embodiment of a rotary reagent tray assembly having a direct drive motor.

The pulley belt 15 is disposed between a pair of idler wheels 22, around a drive wheel 24 that is mechanically coupled to the motor 11, and around the drive shaft 13 or an extension thereof. The drive shaft 13 includes a head portion that is mechanically and/or frictionally coupled to an inner peripheral portion 16 of the primary reagent tray 12. As a result, when the drive shaft 13 rotates, accelerates, decelerates or stops, so does the primary reagent tray 12. Alternatively, the embodied motive means for the primary reagent tray 12 can be replaced by a direct-drive primary motor 71 co-located with the drive shaft 73 as shown in FIG. 7. Bearings 72 are provided to support the drive shaft 73.

The ancillary reagent tray 14 is mechanically coupled to an ancillary motor 21 via a drive wheel 23 at an outer peripheral surface 25. The ancillary motor 21 and drive wheel are structured and arranged to provide independent, bi-directional movement to the ancillary reagent tray 14 by applying a centripetal or tangential force to the outer peripheral surface 25 of the ancillary reagent tray 14.

Although the figures illustrate the primary reagent tray 12 and the ancillary tray 14 of rotary reagent tray assembly being driven, respectively, from an inner peripheral portion 16 and from an outer peripheral surface 25, that is done for descriptive purposes only. Those of ordinary skill in the art can appreciate that a rotary reagent tray assembly 10 structured and arranged as previously described could also include a primary reagent tray 12 and the ancillary tray 14 that are driven instead, respectively, from an outer peripheral surface and from an inner peripheral surface.

The ancillary reagent tray 14 includes an annular, flat or substantially flat, bottom portion 18 that has a plurality of seating areas 27, each of which is structured and arranged for storing and holding a respective ancillary reagent pack 20. Adjacent, cooperating spring-biased clips 55 can be used to securely fasten and hold the ancillary reagent pack 20 in a discrete seating area 27.

Referring to FIG. 1 and FIG. 3, the ancillary reagent tray 14 optionally can be protected by a non-moving cover portion 19 that is structured and arranged to enclose the ancillary reagent tray 14 and the ancillary reagent packs 20 disposed therein, to control the temperature thereof, and to provide structural support to at least one cooling device 26, e.g., at least one thermoelectric Peltier device. Although FIG. 1 and FIG. 3 show a rotary reagent tray assembly 10 with a cooling device-supporting cover portion 19, the tray assembly 10 can be operated without either as shown in FIG. 2.

FIG. 7 shows alternative internal and external cooling devices for a rotary reagent tray assembly 10. According to the embodiment shown in FIG. 7, for external conduction, the tray assembly 10 includes at least one cooling device 26, e.g., a thermoelectric Peltier device, which is disposed on the bottom portion of the tray assembly 10 proximate the rotary motor 71 and rotating shaft 73, which will produce a great deal of heat. Internal cooling is performed by forced air convection. More specifically, a fan assembly 74 is centrally disposed at or near the axis of rotation of the shaft 73. The fan assembly 74 is structured and arranged to create forced-air circulation as shown by the arrows 77. A plurality of cooling fins 76 are provided on the bottom portion of the tray assembly 10. The cooling fins 76 are thermally coupled to the bottom portion, which, in turn, is thermally coupled to the at least one cooling device 26.

In operation, the at least one cooling device 26 is structured and arranged to remove heat from cool the fins 76, which remove heat from the circulating forced-air 77. The fan assembly 74 draws air that has been cooled by the cooling fins 76 via an air duct 75. The cooled air then circulates in the air space above the ancillary reagent packs 20; around the primary reagent packs 18; and back through the cooling fins 76.

The cover portion 19 includes a planar or substantially planar, annular upper portion 28 on which the cooling device(s) 26 can be releasably attached, an outer peripheral surface 25 having at least one loading port 39 for introducing and removing the ancillary reagent packs 20, and an inner surface or inner skirt 37.

The loading port 39 is provided in the outer peripheral surface 25 and permits automatic and/or manual horizontal or substantially horizontal loading and unloading of new or used ancillary reagent packs 20. The dimensions of the ancillary port(s) 20 can be varied to enable insertion/removal of a single ancillary reagent pack 20 or the insertion/removal of multiple ancillary reagent packs 20 simultaneously. To load an ancillary reagent pack 20, the ancillary reagent tray 14 is rotated until a vacant seating area 27 or a seating area 27 currently housing an empty ancillary reagent pack 20 is placed in registration with the ancillary loading port 39. If the seating area 27 is vacant, then an unused ancillary reagent pack 20 can be manually or automatically inserted into the vacant seating area 27 via the loading port 39. If, on the other hand, a used ancillary reagent pack 20 is occupying a needed seating area 27, the used ancillary reagent pack 20 is first removed manually or automatically before a fresh ancillary reagent pack 20 is manually or automatically inserted into the now vacant seating area 27 via the loading port 39.

A reagent probe access area 31 is located in the inner skirt 37 (if there is one) proximate to the at least one pipettor (not shown) that aspirate(s) reagent from the reagent packs. Probe access to the primary reagent pack 35 or to the ancillary reagent pack 20 is provided through at least one hole or opening 32 in a portion of the cover portion 19 of the ancillary tray 14 (if there is one). Because any one container can be positioned beneath at least one hole or opening 32, an aspiration probe movable in X and Z directions only can be employed, in contrast to a probe used with a linear array of containers, which requires the ability to move the probe in X-, Y-, and Z-axes. Probe access holes or openings 32 are structured and arranged to enable the tip(s) of at least one pipettor to puncture the lid of and to aspirate a desired volume of a reagent from a liquid-carrying container 20 or 35.

A single probe access hole or opening 32 disposed in the annular upper portion 28 of the cover portion 19 and multiple access holes 32 disposed in the skirt 37 are shown in FIG. 1 for illustrative purposes only. Those of ordinary skill in the art can appreciate the variations that can be made with the number of redundant pipettors and the number of holes or openings 32.

The primary reagent tray 12 includes an annular bottom portion 33 that is structured and arranged to provide a plurality of container-receiving areas or seating areas 38 each of which is structured and arranged for holding a respective reagent pack 35. A discussion of the seating area 38 and the reagent packs 35 is provided below.

The primary reagent tray 12 is protected by the inner skirt 37 of the cover portion 19 (if there is one), by the annular, flat or substantially flat, bottom portion 18 of the ancillary reagent tray 14, by an inner core cover 34, and by a non-moving outer peripheral surface 36. At least one loading port 30 is provided in the outer peripheral surface 36. The loading port(s) 30 permits automatic and/or manual, horizontal or substantially horizontal loading and unloading of new or used primary reagent packs 35. The dimensions of the loading port(s) 30 can be varied to enable insertion/removal of a single reagent pack 35 or the insertion/removal of multiple reagent packs 35 simultaneously.

To load a reagent pack 35, the primary reagent tray 12 is rotated until a vacant seating area 38 or an empty reagent pack 35 that needs to be removed is placed in registration with the loading port(s) 30. If the seating area 38 is vacant, then an unused reagent pack 35 can be manually or automatically inserted into the vacant seating area 38 via the loading port 30. Adjacent spring-biased clipping devices 59 are adapted to hold an installed reagent pack 35 securely within the seating area 38. Alternatively, a used reagent pack 35 can first be removed manually or automatically from the reagent tray 12 before an unused reagent pack 35 is manually or automatically inserted into the now vacant seating area 38 via the loading port 30.

Reagent Packs

A reagent pack for keeping fluids with or without solid-phase portions mixed or suspended is disclosed in U.S. Pat. No. 5,788,928 (the "'928 Patent") currently assigned to Siemens Healthcare Diagnostics, Inc. of Tarrytown, N.Y., and which is incorporated in its entirety herein by reference.

The '928 reagent pack includes a sub-divided chamber whose sub-chambers are separated by a throat region that is defined by baffles, e.g., an S-shaped channel (or S-channel). Although the reagent packs described in the '928 patent were designed for the rocking action of a linear reagent tray, reagent packs having the same properties are also suitable for use with the rotary reagent tray assembly described herein.

Figure 4A:
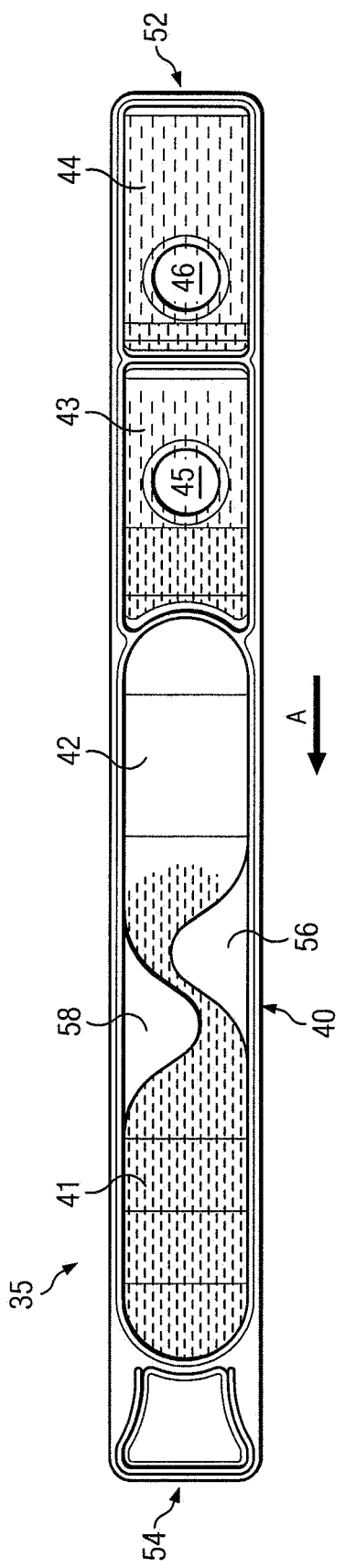
FIG. 4 shows an illustrative schematics of plan (A) and elevation (B) views a reagent pack.
Figure 4B:
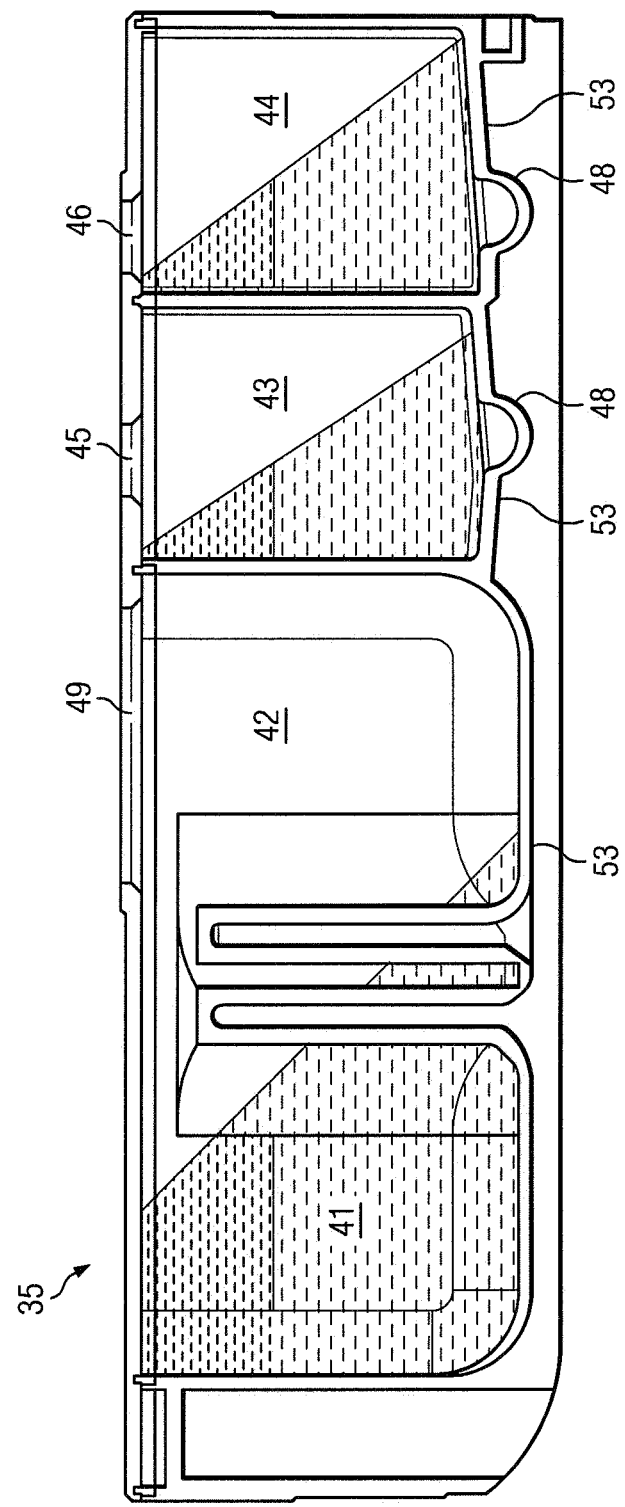

Referring to FIG. 4, the reagent packs 35 that make up a portion of the present invention are designed so that the effects of the bi-directional, rotational movement of the rotary reagent tray assembly 10 and, furthermore, of the periodic stopping of the same adequately mix and/or keep suspended solid-phase reagent portions contained within the liquid portion of the reagent. More specifically, the design of the reagent packs 35, which includes a narrowed throat region 40 between adjacent sub-chambers 41 and 42, in combination with the centrifugal forces that are generated by the rotating reagent tray assembly 10, force all or some portion of the reagent outwards through the restrictive channel 40.

The reagent pack 35 has an inner end 52 and an outer end 54. As shown in FIG. 2, the inner end 52 is closest to the vertical axis 29 of the rotary reagent tray assembly 10 and the outer end 54 is closest to the loading port 30 when aligned therewith. Walls and surfaces that are described in the '928 patent divide each reagent pack 35 into a plurality of chambers 41-44. Each chamber 41-44 is structured and arranged to store a reagent used by the immunoassay system. The reagent can be soluble, which requires little or no agitation for homogenous distribution, or non-soluble, which requires agitation for continuous distribution.

The bottom surface 53 within each of these chambers 41-44 is inclined or pitched toward a single location within the respective chamber, to facilitate complete or substantial aspiration of material stored therein. In a preferred embodiment, this location takes the form of a depression 48 (or sump) disposed in the bottom 53 of a chamber 43 and 44.

At least one of the chambers of each reagent pack 35 can be provided with a pair of opposing, offset baffles 56, 58. In particular, a larger chamber can be divided into two sub-chambers 41 and 42 of substantially equal volume, each of the sub-chambers 41 and 42 is interconnected by the narrow throat region 40, which can include baffles 56 and 58. Each of the baffles 56 and 58 extends from a respective side wall into the larger chamber towards the opposite side wall. The baffles 56 and 58 can be vertically disposed from the floor surface 53 to the upper edge of the side wall, and preferably extend across at least half the width of the reagent pack 35 toward the opposing side wall.

The benefit of such a configuration is realized when suspended solid-phase reagent materials are introduced into the sub-divided chamber and the reagent pack 35 is subjected to a centrifugal force due to the rotation of the primary reagent tray 12. The applied centrifugal force causes fluid to travel from the inner end 52 towards the outer end 54 (arrow A), which is to say, from the first sub-chamber 42 through the baffles 56 and 58 at the narrow throat 40 into the second sub-chamber 41. When no or an inadequate centrifugal force is applied to the reagent packs 35, head pressure and the pitch of the reagent pack 35 cause the fluid to travel from the second sub-chamber 41 through the baffles 56 and 58 at the narrow throat 40 into the first sub-chamber 42.

Fluent material, carrying the suspended solid-phase reagent portions, greatly accelerates as it passes through the throat 40, resulting in significant agitation of the solid-phase reagent portion and the fluid carrier through currents circulating about the perimeter of the sub-chambers 41 and 42. Complete, homogenous distribution is achieved rapidly, with the exact speed of mixing depending upon, inter alia, the pitch of the reagent pack, the rotational velocity, the reagent intermixed, the type and viscosity of the fluid carrier, temperature, and so forth.

Further, the container-receiving stations or seating areas 38 of the annular portion of the primary reagent tray 12 are pitched or inclined so that, when disposed therein, the reagent packs 35 are pitched downward towards the vertical axis 29 at an angle. The benefits of pitching the reagent packs 35 include: when the tray 12 is stopped, the pressure head and the effects of gravity will draw a portion of the reagent inwards towards the inner end 52 and through the restrictive channel 40, which, advantageously, mixes the solid-phase reagent portion and re-suspends and re-mixes any settled solid-phase portions.

Reagent packs 35—such as ReadyPacks manufactured by Siemens Healthcare Diagnostics, Inc. of Tarrytown, N.Y.—are or should be specifically designed to be placed in and held in a seating area 38 at an angle that is five (5) degrees below the horizontal during aspiration of the reagent from the reagent pack. However, steeper pack angles of 20 degrees below the horizontal or more provide greater mixing. When pack angles exceed the pre-established five degrees for aspiration, the rotary reagent tray assembly 10 may include a raising means that is adapted to elevate the lower end of the reagent pack 35, say from 20 degrees below the horizontal to 5 degrees below horizontal. Preferably, reagent packs 35 are raised at a single pre-designated location(s), e.g., proximate the reagent aspiration probe and the reagent probe access area 31.

Each of the chambers 41-44 is covered with a lid, e.g., a HDPE lid. Each lid is structured and arranged to include plural apertures 45, 46, and 49 that protect the chamber contents from contamination but that are easily penetrable by a reagent probe. Moreover, an important criteria is that the aperture-covering material remains inactive with the enclosed reagent. For example a combination of polyester and ethyl vinyl acetate (EVA) films, or a combination of polyester and HDPE films, and so forth can be used. Alternatively, a single layer of film is employed.

The apertures 45, 46, and 49 are substantially aligned with respective underlying chambers 43, 44, and 42, and, more preferably, with reagent pack chamber floor depressions 48. Each aperture 45, 46, and 49 may be covered separately, or all can be covered by a continuous portion of aperture covering material.

Operation of the Rotary Reagent Tray Assembly and Motion Profiles

Those of ordinary skill in the art can appreciate that there are a myriad of variables that can affect the proper function, i.e., continuous and proper mixing, suspension, and/or resuspension of solid-phase reagent portions, of the rotary reagent tray assembly, e.g., diameter of the tray, distance of the reagent pack from the vertical axis, the pitch angle of the reagent packs, reagent pack design (S-channel or other), and motion profiles, just to name a few. This section will address motion profiles and how they can be used to best advantage to ensure that the solid-phase reagent portions are suspended and properly mixed within the appropriate sub-chamber immediately prior to aspiration.

One of the limitations of conventional linear rocking mixers is that the motion profile cannot be changed to increase the energy and "sloshing" of the reagent significantly. Thus, rotary mixing is superior to rocking mixing, inter alia, in its ability to re-suspend solid-phase reagent portions within the fluid reagent solution. Indeed, as described in greater detail below, the acceleration/deceleration, maximum velocity, stopping, and other parameters can be altered to increase the instantaneous energy and "sloshing" of the reagent.

Figure 5:
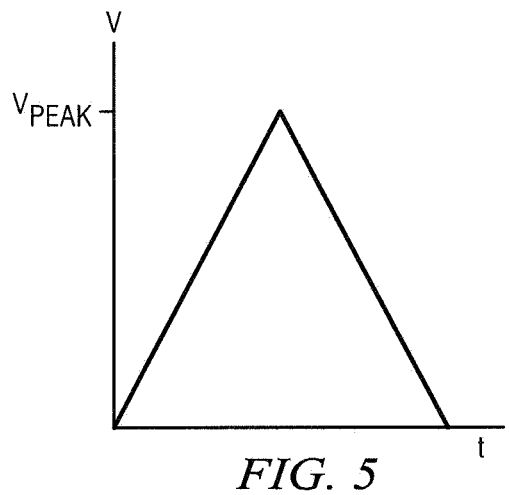
FIG. 5 shows an exemplary triangular motion profile.
Figure 6:
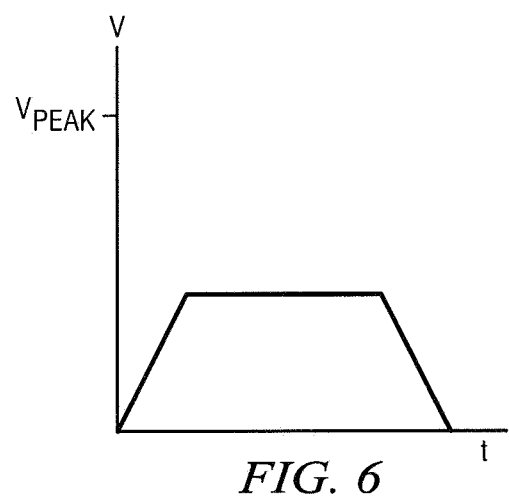
FIG. 6 shows an exemplary trapezoidal motion profile.

FIG. 5 and FIG. 6 illustrate, respectively, a triangular motion profile and a trapezoidal motion profile. The triangular motion profile includes a steadily increasing rotational velocity and a steadily decreasing velocity after some peak velocity is reached. The rapid and steadily increasing velocity makes triangular motion profiles more ideal for initial start-up and for reagents that require more violent mixing.

In contrast, the trapezoidal motion profile (FIG. 6) includes a steadily increasing rotational velocity that flattens out for a period of time followed by a steadily decreasing velocity. Trapezoidal motion profiles are better for maintaining already suspended solid-phased portions in suspension.

The immunoassay system and/or the rotary reagent tray assembly 10 further includes a controller, e.g., a processor, microprocessor, and the like, that is structured and arranged to control at least one of: velocity, rate of acceleration, rate of deceleration, stopping, and direction of rotation of the motor. Moreover, the controller is adapted to operate the rotary reagent tray periodically, randomly, intermittently, at a prescheduled time, in accordance with one of a plurality of pre-established motion profiles, and on-command.

Initial Re-suspension Testing Results

In order to evaluate the effectiveness of the rotary reagent tray assembly and of mixing the solid-phase reagent portion, rotary mixing was compared with manual mixing using S-channel packs in each instance. For the comparison, aHBS, CEA, and H2n assays were specifically chosen because the three assays are notorious for experiencing re-suspension issues.

The degree of mixing was evaluated subjectively and objectively using visual and absorbance measurement techniques, respectively. For the former, the "amount" of mixing was characterized using the number of traversals of the S-channel. In the case of the latter, absorbance was measured at 600 nm and aliquots were sampled from top, middle and bottom layers of the reagent.

The results of absorbance testing for manual and rotary fixture mixing in connection with aHBS, CEA, and H2n assays were performed using a linear Centaur fixture manufactured by Siemens Healthcare Diagnostics, Inc. of Tarrytown, N.Y. and a rotary reagent tray assembly. The intralayer absorbance averages for manual and rotary fixture mixing for each assay confirm that a rotary reagent tray assembly with Readypacks is fully capable of suspending the solid-phase reagent portion.

On-Board Stability Testing

As previously mentioned, arresting motion of the rotary reagent tray has many benefits. First, it allows motors and controllers to be shut off, which reduces heat output, saves energy, and reduces wear and tear on the system. Second, when rotary motion is stopped, solid-phase particles in the reagent come to rest, which improves, inter alia, the on-board stability of the solid-phase reagent.

On-Board stability (OBS) is a measure of the usable and useful life of a discrete reagent once the reagent pack has been first opened and made available for use. In short, OBS is a measure of the "shelf-life" of the reagent once it is on-system, which, on average, can range from 7 to 45 days.

OBS is affected by oxidation and/or other chemical reactions that may affect the reagent and, more pertinent to the present invention, to the effect that constant mechanical mixing may have on the solid-phase portions of the reagent, i.e., disaggregation, wear on particles, and the like. As previously mentioned, a back-and-forth rocking-type motion requires 24 hours, 7 day a week application.

Typically, the more movement and agitation to which the solid-phase particles are subjected, the shorter the OBS life. Hence, advantageously, non-operation or downtime of the rotary tray equates into extended OBS life of the solid-phase reagent. Indeed, with the rotary reagent tray assembly of the present invention, functioning of the assay system can be stopped at the end of an 8-hour shift, which is likely to cause the OBS to increase, yet, after a shutdown and substantial settling time, the solid-phase portions can be resuspended using an appropriate motion profile, e.g., a triangular motion profile. Indeed, one of the many advantages of the rotary reagent tray assembly is that it provides better mixing at start-up compared to linear-type or other rotary-type reagent trays.

OBS data for a linear (Centaur) reagent tray and a rotary reagent tray assembly using TUp and DIG reagents was collected. TUp and DIG reagents were chosen due to their relatively short OBS—respectively four and three days. The rotary reagent tray and the linear (Centaur) reagent tray were run continuously with five (5) seconds of rocking followed by ten (10) seconds idle for five (5) days. The rotary profile includes three (3) 180-degree moves in eight (8) seconds to model the supposed worst case. The results demonstrate no adverse impact to OBS for reagents that are mixed using a rotary reagent tray assembly versus a linear, rocking reagent tray.

Although the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What we claim is:

1. An apparatus for enabling enhanced, selective agitation of a liquid, comprising:
    plural liquid-bearing containers each having a first end and an opposite second end, each container comprising at least one internal baffle for imparting turbulent agitation to the liquid within the respective container when flowing from one end of the container to an opposite end thereof;
    a circular tray adapted for selective rotation about a vertical axis of rotation and having plural container-receiving stations arranged on the tray radially from the vertical axis, each station is inclined at an angle with respect to a horizontal plane and adapted to receive and selectively retain a respective liquid-bearing container in an orientation whereby the respective container is inclined between about five degrees and twenty degrees with respect to the horizontal plane, and whereby the first end of the respective container, proximate the axis of rotation, is disposed lower than the second end of the container, distant from the axis of rotation;
    a motor in driving engagement with the tray and adapted for selectively rotating the tray;
    a circular cover portion enclosing the circular tray and the plural container-receiving stations for providing a temperature-controllable environment for the liquid in each of the plural liquid-bearing containers; and
    a plurality of thermoelectric Peltier devices supported by and distributed on an upper surface of the cover portion for enabling temperature control of the environment within the cover portion,
    wherein centrifugal force commensurate with rotation or rotational acceleration of the tray about the vertical axis of rotation causes the liquid in each of the plural containers to travel from the first end of the container to the second end of the container and thereby to agitate said liquid when it flows through the at least one internal baffle, and
    wherein gravitational force associated with a cessation of rotation or rotational deceleration of the tray about the vertical axis of rotation causes the liquid in each of the plural containers to travel from the second end of the container to the first end of the container and thereby to agitate said liquid when it flows through the at least one internal baffle.

2. The apparatus as recited in claim 1, further comprising a second circular tray coaxial and concentric with the circular tray and adapted for independent selective rotation about the vertical axis of rotation.

3. The apparatus as recited in claim 2, wherein the second circular tray includes plural container-receiving stations arranged radially from the vertical axis, each station adapted to receive and selectively retain a respective liquid-bearing container in an orientation.

4. The apparatus as recited in claim 2, wherein the second circular tray is operationally coupled to a second motor that is adapted for selectively rotating the second circular tray.

5. The apparatus as recited in claim 2 further comprising peripheral openings in each of the circular tray and the second circular tray for automatic or manual loading of liquid-bearing containers in a radial direction with respect to the vertical axis.

6. The apparatus as recited in claim 1, wherein each station on the circular tray includes cooperating retaining devices to hold the respective liquid-bearing container securely during rotation.

7. The apparatus as recited in claim 6, wherein the cooperating retaining devices at each station on the circular tray are structured and arranged to enable horizontal or substantially horizontal loading.

8. The apparatus as recited in claim 2, wherein each station on the second tray includes cooperating retaining devices to hold the respective liquid-bearing container securely during rotation.

9. The apparatus as recited in claim 8, wherein the cooperating retaining devices at each station on the circular tray are structured and arranged to enable horizontal or substantially horizontal loading.

10. The apparatus as recited in claim 1, wherein the motor includes a rotor that is adapted to engage and provide motion to the tray directly or indirectly.

11. The apparatus as recited in claim 1 further comprising a controller for controlling at least one of a velocity, a rate of acceleration, a rate of deceleration, a stopping, and a direction of rotation of the motor, to operate at least one of periodically, randomly, intermittently, at a prescheduled time, in accordance with one of a plurality of pre-established motion profiles, and on command.

12. The apparatus as recited in claim 1, wherein the at least one internal baffle includes a pair of baffles that are structured and arranged to provide an S-shaped channel therebetween.

13. The apparatus as recited in claim 1, wherein the cover portion includes a plurality of probe access openings to enable a tip of a pipettor to access any one of the plural liquid-bearing containers and to aspirate said liquid from said liquid-bearing container.

14. The apparatus as recited in claim 1, wherein the cover portion includes at least one loading access port for loading or unloading at least one of the plural liquid-bearing containers manually or automatically.

15. The apparatus as recited in claim 1 further comprising a plurality of cooling fins and a fan assembly, that are adapted to cool the plural liquid-bearing containers by forced-air convection.

16. The apparatus as recited in claim 15, said cooling fins being disposed beneath the circular tray and said fan assembly being disposed above said circular tray.

17. A method of selectively agitating liquid in a container, comprising:
   providing plural liquid-bearing containers each having a first end and an opposite second end, each container comprising at least one internal baffle for imparting turbulent agitation to a liquid within the respective container when flowing from one end of the container to an opposite end thereof;
   providing a circular tray rotatable about a vertical axis of rotation and having plural container-receiving stations arranged on the tray radially about the vertical axis, each station is inclined at an angle with respect to a horizontal plane and adapted to receive and selectively retain a respective liquid-bearing container in an orientation whereby the respective container, once disposed on the station, is inclined between about five degrees and twenty degrees with respect to the horizontal plane towards said vertical axis, and whereby the first end of the respective container, proximate the axis of rotation, is disposed lower than the second end of the container, distant from the axis of rotation;
   disposing one of the plural containers on a respective container-receiving station;
   enclosing the circular tray and plural container-receiving stations with a circular cover portion for providing a temperature-controllable environment for the liquid in each of the plural liquid-bearing containers;
   supporting a plurality of thermoelectric Peltier devices on an upper surface of the cover portion for enabling temperature control of the environment within the cover portion; and
   agitating the liquid within each of the plural containers by selectively rotating said tray about the vertical axis of rotation via a motor in mechanical engagement therewith, whereby centrifugal force, associated with rotation or rotational acceleration of the tray, causes said liquid in each container to travel from the first end of the container to the second end of the container via the at least one internal baffle; and
   further agitating the liquid using gravitational force that is associated with a cessation of rotation or rotational deceleration of the tray with respect to the vertical axis of rotation, causing said liquid in each container to travel from the second end of the container to the first end of the container via the at least one internal baffle.

18. The method as recited in claim 17 further comprising controlling at least one of a velocity, a rate of acceleration, a rate of deceleration, a stopping, and a direction of rotation of the motor, to operate at least one of periodically, randomly, intermittently, at a prescheduled time, in accordance with one of a plurality of pre-established motion profiles, and on command.

19. The method as recited in claim 18 wherein the pre-established motion profile includes a steadily increasing rotational velocity and a steadily decreasing velocity after a pre-determined peak velocity is reached.

20. The method as recited in claim 18 wherein the pre-established motion profile includes a steadily increasing rotational velocity that flattens out for a period of time followed by a steadily decreasing velocity, for maintaining already suspended solid-phased portions in suspension.

21. The method as recited in claim 19 further comprising periodically stopping the circular tray and aspirating a liquid sample from one of the liquid-bearing containers using a probe or a pipettor.

22. The method as recited in claim 21 further comprising controlling movement of the probe or pipettor in an X- and a Z-axis only.

23. The method as recited in claim 17, further comprising cooling each of the plural liquid-bearing containers by forced-air convection using a fan assembly and a plurality of cooling fins.

24. The method as recited in claim 23, further comprising: disposing said cooling fins beneath the circular tray and disposing said fan assembly above said circular tray.

* * * * *